Patented June 1, 1937

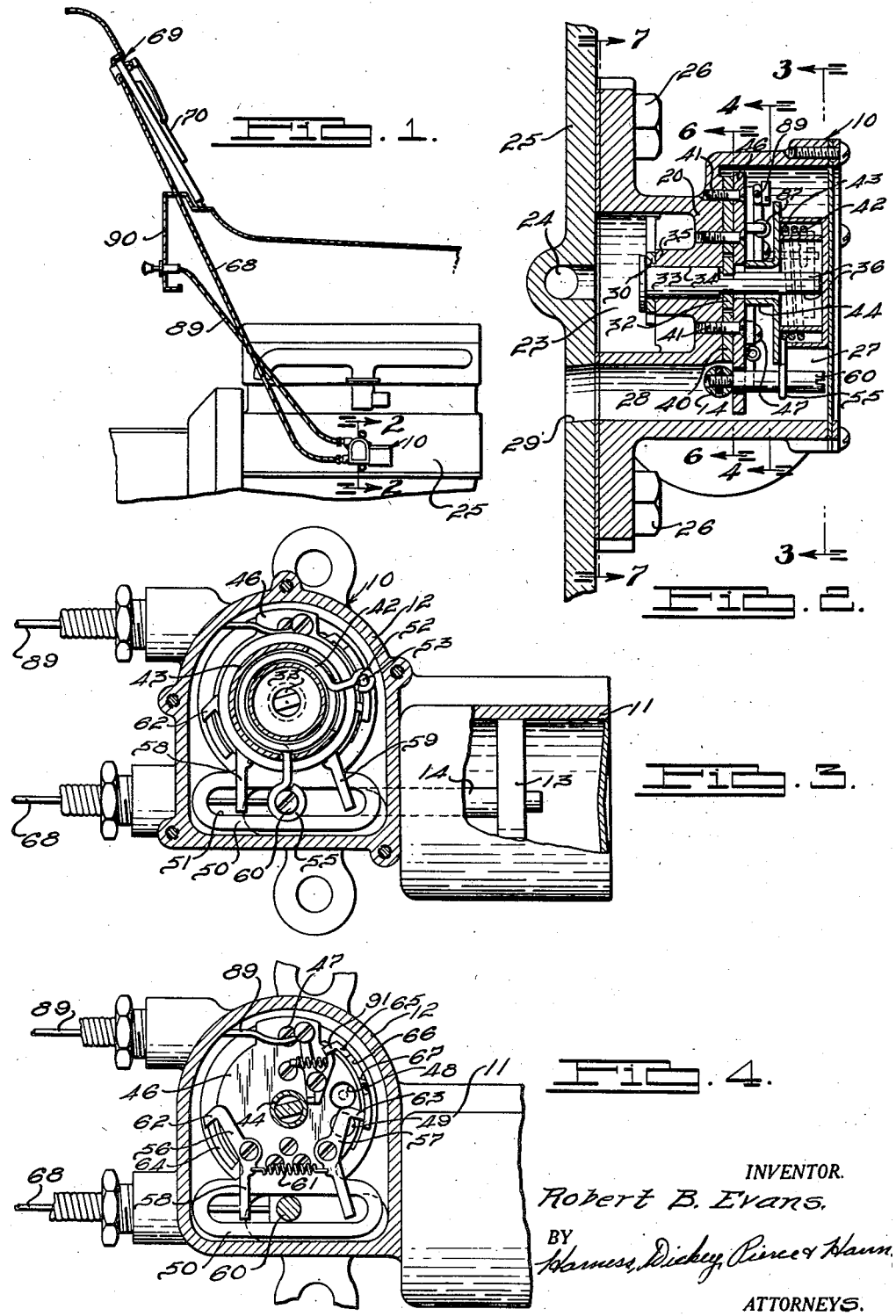

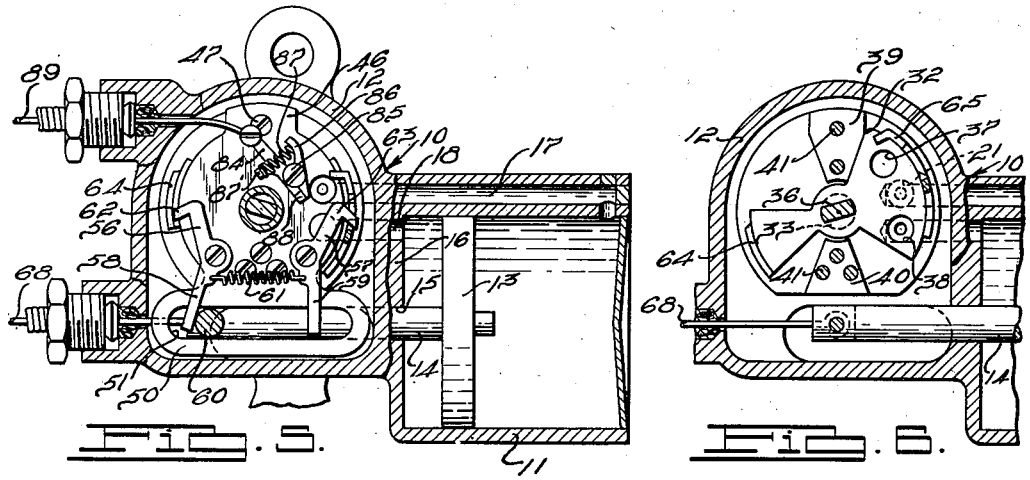

2,082,485

UNITED STATES PATENT OFFICE 2,082,485

WINDSHIELD WIPING MOTOR

Robert B. Evans, Detroit, Mich., assignor to E. S. Evans & Sons, a corporation of Michigan Application May 13, 1935, Serial No. 21,137

14 Claims. (Cl. 121—164)

This invention relates to improved windshield wiper motors.

More particularly the invention pertains to improvements in fluid operable windshield wiper motors such as motors of this character which are operable by oil pressure of a conventional internal combustion engine pressure lubricating system.

One of the main objects of the invention is to provide improved valve mechanism in a motor of this kind which is so constructed and arranged as to effect a rapid reversal in the direction of oscillatory movement of a wiper blade as soon as the blade reaches either end of its path of movement.

Another object of the invention is to provide a torsional spring for actuating the reversing valve mechanism which is adapted to act resiliently in respectively opposite directions from a relaxed position.

A further object of the invention is to provide improved means for tensioning a torsion spring of this character in respectively opposite directions during correspondingly opposite movements of the windshield wiper blade.

An additional object of the invention is to provide in a motor of this character, a torsionally acting coil spring and valve mechanism operable thereby, by virtue of which are obtainable the advantages of the inherent strength, lightweight, speed of action and limited required amount of flexure of springs of this character.

A still further object of the invention is to provide fast acting reversing valve mechanism in a windshield wiper motor which is devoid of delicate parts and yet rapid in its action and susceptible of operation by a comparatively strong resilient member that is capable of overpowering the movement retarding influences to which devices of this kind are naturally subjected during prolonged use.

Another object of the invention is to provide improved manual controlled mechanism for selectively rendering the motor operative and inoperative respectively; to provide control mechanism of this kind which interrupts the operation of the windshield wiper blade and maintains it in a predetermined parked position regardless of the location of the blade at the instant the control mechanism is actuated.

Other objects of the invention are to provide locking means operable by control apparatus of this character which releasably, but positively holds the valve mechanism in an inoperative position and which is not releasable by jar or vibrations of the order to which motors of this kind are subjected when installed on vehicles; and to provide a simple and inexpensive motor of this character in which the main portion of the moving parts are confined within a casing and lubricated, during operation, by the fluid pressure medium by which it is actuated.

The above being among the objects of the present invention, the same consists in certain novel features of construction and combinations of parts to be hereinafter described with reference to the accompanying drawings and then claimed, having the above and other objects in view.

An illustrative embodiment of the invention is shown in the accompanying drawings, in which:

Fig. 1 is a fragmentary, longitudinal, vertical sectional view of the front end portion of a vehicle which is equipped with an improved windshield wiping motor embodying the invention and showing the motor in side elevation.

Fig. 2 is an enlarged, vertical sectional view of the motor taken on the line 2—2 of Fig. 1.

Fig. 3 is a transverse, vertical sectional view taken on the line 3—3 of Fig. 2.

Fig. 4 is a transverse, vertical sectional view taken on the line 4—4 of Fig. 2, showing the parts of the motor in the relative positions they occupy during movement of the piston of the motor in one direction.

Fig. 5 is a vertical sectional view, similar to Fig. 4, but showing the parts of the motor in the positions they occupy during movement of the piston of the motor in an opposite direction.

Fig. 6 is a transverse, vertical sectional view taken on the line 6—6 of Fig. 2.

Fig. 7 is a transverse, vertical sectional view taken on the line 7—7 of Fig. 2.

Fig. 8 is a longitudinal sectional view of the motor taken on the line 8—8 of Fig. 7.

Fig. 9 is an elevational view showing blade oscillating mechanism operable by the improved motor, portions of the mechanism being removed to disclose the underlying structure.

Fig. 10 is a transverse sectional view of the blade oscillating mechanism taken on the line 10—10 of Fig. 9.

In the form of the invention illustrated in the drawings, the improved windshield wiper motor includes a casing, generally designated by the numeral 10, having a cylinder portion 11 and a valve enclosing portion 12. Reciprocably mounted in the cylinder portion 11 of the casing 10 is a piston 13 having a piston rod 14 rigidly fixed thereto and slidably mounted in an aperture 15 of a partitioning wall 16 located between the valve enclosing and cylinder portions of the casing 10. Formed in the partitioning wall 16 is a passage 18 which leads from the valve enclosing portion 12 of the casing to the interior of one end of the cylinder 11. A substantially parallel passage 17 formed in the wall of the cylinder portion 11 also leads from the valve enclosing portion of the casing 10 and communicates with the interior of the opposite end portion of the cylinder.

Formed between the opposite extremities of the valve enclosing portion 12 of the casing 10 is a transverse web 20 into which the passages 17 and 18 extend. The left ends of the passages 17 and 18, as viewed in Fig. 5, communicate with ports 21 and 22, respectively, extending through the web structure 20 in a direction substantially perpendicular to the passages 17 and 18. The left ends of the ports 21 and 22 which are somewhat reduced in diameter with respect to the opposite ends thereof, communicate directly with a fluid pressure medium inlet chamber 23, as viewed in Fig. 8, which is in turn supplied with a fluid medium under pressure, through a passage 24 formed in a wall of an internal combustion engine crank case 25 to which the casing 10 is detachably secured by bolts 26. The right end portions of the ports 21 and 22, as viewed in Fig. 8, lead to a fluid pressure medium return chamber 27 which communicates with an outlet passage 28 through which fluid medium discharged from the cylinder 11 is returned to the crank case, the crank case wall 25 being provided with an opening 29 which registers with the passage 28 for admitting the return of the fluid medium to the crank case of the engine.

The admission of fluid medium to and the release thereof from the respectively opposite end portions of the cylinder 11 is controlled by valve mechanism, having a valve element 30 associated with the inlet ends of the ports 21 and 22 and a valve element 32 associated with the outlet ends thereof. The valve element 30 has a press fit on a shaft 33 journaled in a central aperture 34 formed in the web structure 20 and which extends through a boss 35 provided on the left side of the web structure 20, as viewed in Fig. 2. The shaft 33 has a right end portion provided with flat sides 36 on which the valve element 32 is mounted for oscillatory movement in unison therewith. Formed in the valve element 32 are ports 37 and 38, which are so spaced apart that one only is adapted to register with one only of the ports 21 and 22 when the valve element is at opposite limits of its travel. Rotation of the valve element 32 is limited in respectively opposite directions by diametrically opposite stops 39 and 40 which are secured to the web structure 20 by screws 41 as illustrated in Fig. 2.

The ports 37 and 38 of the valve element 32 are so constructed and arranged that when the valve element is in its upper limit of oscillatory movement, the outlet end of the port 21 is closed while the port 38 of the valve element 32 registers with the outlet end of the port 22, thereby permitting fluid medium to flow from the left end portion of the cylinder as viewed in Fig. 5, and to pass into the return chamber 27 and to ultimately drain back into the crank case. When the valve element 32 is at its lowermost limit of oscillatory movement, the outlet end portion of the port 22 is closed and the port 37 of the valve element 32 registers with the outlet end portion of the port 21 so as to permit fluid medium to flow from the right end portion of the cylinder 11 into the return chamber 27 and to ultimately drain back into the crank case of the engine.

The valve element 30 is so angularly disposed with respect to the valve element 32 as to close the inlet end of that one of the ports 21 and 22 which is open at its outlet end and to open the inlet end of that port which is closed at its outlet end. In this manner communication is established between the fluid medium inlet chamber 23 and the right end portion of the cylinder 11 while the left end portion of the cylinder 11 is in communication with the return chamber 27, and communication is established between the right end of the cylinder 11 and the inlet chamber 23 when the left end of the cylinder is in communication with the return chamber 27, thereby reciprocating the piston in response to a reversal of the position of the valve elements 30 and 32.

The valve elements 30 and 32 are automatically controlled in response to movement of the piston 13 by mechanism including a torsionally acting coil spring 42 which is concentrically mounted with respect to the shaft 33 and disposed within a casing 43. The casing 43 has an axially extending hub portion 44 which is journaled on the shaft 33 adjacent a plate 46 that is located on the right side of the valve element 32, as viewed in Fig. 2, and secured to the web structure 20 by screws 47. The plate 46 is provided with apertures 48 and 49 which register with the outlet ends of the ports 21 and 22, respectively, for permitting the passage of fluid medium from the passages 17 and 18 into the return chamber 27 when the valve mechanism is appropriately positioned. Formed on the lower end of the plate 46 is an extension 50 in which a slot 51 is provided. The coil spring 42 has an eye 52 in which a pin 53 carried by the valve element 32 is engaged. The other end of the coil spring 42 is provided with an eye 55 that is attached to the piston rod 14 by a pin 60. During leftward movement of the piston 13 and piston rod 14 the spring 42 is tensioned to resiliently urge the shaft 33 in a clockwise direction as viewed in Fig. 3, and during movement of the piston 13 and piston rod 14 in a rightward direction, the spring 42 is tensioned to urge the valve element 32 in a counter-clockwise direction.

Movement of the shaft 33 and valve mechanism associated therewith simultaneously with the reciprocatory movement of the piston rod 14 is prevented by releasable latch mechanism, best shown in Figs. 4 and 5, which includes a pair of detents 56 and 57. The detents 56 and 57 are pivotally mounted on the plate 46 and they are provided with downwardly extending arms 58 and 59, respectively, which project into the path of a pin 60 carried by the piston rod 14 and which extends outwardly through the slot 51 of the plate 46. The downwardly extending arms 58 and 59 of the detents 56 and 57, respectively, are yieldably urged together by a spring 61 which normally urges the upper ends of the detents outwardly with respect to each other. Formed on the upper extremities of the detents 56 and 57 are outwardly extending latch flanges 62 and 63, respectively, which are adapted to cooperate with circumferentially spaced peripheral flanges 64 and 65, respectively, formed on the valve element 32. The latching flanges 62 and 63 of the detents 56 and 57 are so constructed and arranged with respect to the peripheral flanges 64 and 65 of the valve element 32 that when the flange 62 of the detent 56 is engaged over the extremity of the flange 64 of the valve element 32, as illustrated in Fig. 4, the flange 63 of the detent 57 abuts the inner peripheral surface of the flange 65 of the valve element 32 and rides thereon during reversal of the position of the valve mechanism from the position thereof shown in Fig. 4. When the releasable latch mechanism is in the positions shown in Fig. 4, the shaft 33 and valve elements associated therewith are held against clockwise rotation under the action of the spring 42 until the pin 60 engages the lower extremity 58 of the detent 56 and turns the latter in a clockwise direction sufficiently to bring the flange 62 of the latch 56 out of engagement with the upper extremity of the peripheral flange 64 of the valve element 32. As soon as this condition exists, the coil spring 42 rapidly rotates the shaft 33 and the valve elements associated therewith in a clockwise direction until the opposite limit of movement of the valve mechanism is reached. As clockwise rotation of the valve element 32 is limited by the stop 40, the flange 63 of the detent 57 extends through a slot 66 in the peripheral flange 65 and engages the lower extremity 67 thereof so as to hold the valve mechanism against counter-clockwise rotation as the torsional coil spring 42 is tensioned by rightward movement of the piston rod 14. The valve mechanism is so held until the piston rod 14 and the pin 60 carried thereby reach the right-hand limit of its path of movement and retracts the flange 63 of the detent 57 by counter-clockwise rotation of the latter in the manner above described in the discussion of the operation of the detent 56. The foregoing cycle of operation is repeated successively during continued operation of the motor.

Reciprocatory movement of the piston and piston rod 14 is transmitted, preferably by a flexible wire cable 68 or other suitable means, to driving mechanism, generally designated by the numeral 69, of a windshield wiping blade 70. This driving mechanism includes an operating shaft 71 journaled in a bushing 72 which extends through suitable orifices formed in a windshield frame 73 and which is detachably secured thereto by a nut 74 threaded on the outer end of the bushing 72. The bushing 72 has a radial flange 75 which is seated in a recess 76 of a casing section 77, the latter being detachably secured to the windshield frame by the bushing 72. Mounted on the casing section 77 is a complementary casing section 78 which is detachably secured thereto by screws 79. The inner end portion of the shaft 71 is provided with a gear segment 80 having teeth 81 meshed with teeth 82 of a rack 83 which is slidably mounted in the casing. One end of the flexible cable 68 is fixed to the rack 83 so as to reciprocate the latter in unison with the reciprocatory movement of the piston 13 and piston rod 14, and to thereby oscillate the gear segment 80, shaft 71 and wiper blade 70.

The windshield wiper operating motor is provided with control mechanism by which the wiper blade 70 may be parked in a predetermined position when it is desired to render the apparatus inoperative. This control mechanism includes a lever 84 pivotally mounted on the plate 46 by a screw 85. Journaled on the screw 85 adjacent the lever 84 is a detent 86 which is normally held in a predetermined angular relationship with respect to the lever 84 by a coil spring 87 bearing between the upper end of the detent 86 and a flange 87' carried by the lever 84. The lower end portion of the lever 84 is provided with a stop 88 against which the lower end portion of the detent 86 is held by the spring 87, while the control mechanism is positioned to allow operation of the motor. The lever 84 and detent 86 associated therewith are rotatable from the inoperative position shown in Fig. 5, to the operative position shown in Fig. 4 by a flexible cable 89 which preferably extends from the windshield wiper motor to the instrument board 90 of the vehicle or to any location within convenient reach of the operator thereof. When the control mechanism is placed in the operative position illustrated in Fig. 4 and the valve mechanism is thereafter rotated by the torsional coil spring 42 from the position illustrated in Fig. 5 to the position illustrated in Fig. 4, the detent 86 is engaged by a flange 91 extending inwardly from the upper extremity of the peripheral flange 65 of the valve element 32. This action rotates the detent 86 in a counter-clockwise direction, as viewed in Fig. 4, sufficiently to allow the upper extremity of the detent to become engaged under the flange 91 so as to thereby hold the valve mechanism against returning to the position shown in Fig. 5, and, as a result, the piston 13 remains at the left end of its stroke, while the control apparatus is so set. Regardless of the position of the wiper blade 70 at the instant the control mechanism is actuated to bring the detent 86 into inoperative position, the motor continues to function until the piston has reached the left end of its stroke and, therefore, the wiper blade 70 is always returned to a predetermined parked position.

By virtue of the foregoing structure, it is possible to employ a relatively strong, yet lightweight torsional coil spring which, by reason of its inherent properties, is particularly adapted to be tensioned alternately in respectively opposite direction and which reverses the setting of the valve mechanism rapidly as the piston reaches the respectively opposite ends of its stroke. The control mechanism positively holds the valve element in a selected position in a self-locking manner and it is not susceptible of unintended release by jar or vibration of the order to which instruments of this character of a vehicle are subjected.

Although but one specific embodiment has been described and illustrated, it will be apparent to those skilled in the art that various changes, omissions, additions and substitutions may be made therein without departing from the spirit and scope of my invention, as set forth in the accompanying claims.

What I claim is:

1. A windshield wiper motor including a casing having a cylinder therein and having passages communicating with respectively opposite end portions of said cylinder for supplying a fluid pressure medium thereto and exhausting such medium therefrom, a piston in said cylinder, valve elements for controlling the supplying of said fluid pressure medium to and the exhausting thereof from the respectively opposite ends of said cylinder, means for actuating said valve elements including a torsional coil spring operatively connected with said piston and adapted to be torsionally tensioned in respectively opposite directions by movement thereof, and latch mechanism responsive to movement of said piston for releasably holding said valve elements against movement by said spring until said piston is substantially at one of the limits of its movement.

2. A windshield wiper motor including a casing having a cylinder therein and having passages communicating with respectively opposite end portions of said cylinder for supplying a fluid pressure medium thereto and exhausting such medium therefrom, a piston in said cylinder, valve mechanism for controlling the supplying of said fluid pressure medium to and exhausting thereof from the respectively opposite ends of said cylinder including a coil type torsional spring and including means operable by said piston for torsionally tensioning said spring in respectively opposite directions during each cycle of operation of said motor, and manually operable locking mechanism including a pivotally mounted detent engageable with a portion of one of said valve elements for positively holding the latter against movement from a limiting position corresponding with one of the limiting positions of said piston, said detent being rotatable by engagement with said valve element during rotation of the latter toward said limiting position thereof to accommodate movement of said portion of said valve element into positive locked relationship with respect to said detent regardless of the position of said valve elements when said detent is set in its operative position.

3. A windshield wiper motor including a casing having a cylinder therein and having passages communicating with respectively opposite end portions of said cylinder for supplying a fluid pressure medium thereto and exhausting such medium therefrom, a piston in said cylinder, valve elements for controlling the supplying of said fluid pressure medium to and the exhausting thereof from the respectively opposite ends of said cylinder, means for actuating said valve elements including a torsional coil spring operatively connected with said piston and adapted to be torsionally tensioned in respectively opposite directions by movement thereof, latch mechanism responsive to movement of said piston for releasably holding said valve elements against movement by said spring until said piston is substantially at one of the limits of its movement, and manually operable locking mechanism including a pivotally mounted detent engageable with a portion of one of said valve elements for positively holding the latter against movement from a limiting position corresponding with one of the limiting positions of said piston, said detent being rotatable by engagement with said valve element during rotation of the latter toward said limiting position thereof to accommodate movement of said portion of said valve element into positive locked relationship with respect to said detent regardless of the position of said valve elements when said detent is set in its operative position.

4. A windshield wiper motor including a fluid pressure chamber having passages for supplying a fluid pressure medium to and exhausting the latter from the respectively opposite end portions thereof, a pressure responsive member in said chamber operable by said fluid pressure medium, valve mechanism for controlling the supply of fluid pressure medium to and exhausting of such medium from the opposite ends of said chamber, and manually operable locking mechanism for stopping said motor including a pivotally mounted detent engageable with said valve mechanism for positively holding the latter against movement from a position corresponding with one of the limiting portions of said piston, said detent being rotatable by engagement with said locking mechanism during movement of the latter toward said limiting position thereof to accommodate movement of said valve mechanism into positive locked relationship with respect to said detent regardless of the position of said valve mechanism when said detent is set in its operative position.

5. A windshield wiper motor including a casing having a fluid pressure chamber and a valve mechanism enclosing chamber therein, a transverse partitioning wall in said chamber having spaced ports extending therethrough, each communicating at one end with a fluid pressure medium outlet and at its other end with a fluid pressure medium inlet, a pair of passageways in said casing, one connecting each port with an end portion of said chamber respectively, a pressure responsive member in said chamber operable by said fluid pressure medium, a pair of valve elements, each disposed adjacent one of the opposite sides of said wall respectively and angularly disposed with respect to each other so as to alternately establish communication between one and then the other end of said chamber and said fluid medium inlet and alternately between the one and then other end of said chamber and said fluid pressure outlet respectively, and actuating apparatus for said valve elements including a resilient member energizable by said fluid pressure responsive means for reversing the positions of said valve elements.

6. A windshield wiper motor including a casing having a fluid pressure chamber and a valve mechanism enclosing chamber therein, a transverse partitioning wall in said chamber having spaced ports extending therethrough, each communicating at one end with a fluid pressure medium outlet and at its other end with a fluid pressure medium inlet, a pair of passageways in said casing, one connecting each port with an end portion of said chamber respectively, a pressure responsive member in said chamber operable by said fluid pressure medium, a pair of valve elements, each disposed adjacent one of the opposite sides of said wall respectively and angularly disposed with respect to each other so as to alternately establish communication between one and then the other end of said chamber and said fluid medium inlet and alternately between the one and then other end of said chamber and said fluid pressure outlet respectively, and actuating apparatus for said valve elements including a torsional coil spring energizable by said pressure responsive means and including latch mechanism for holding said valve elements against movement by said spring until said pressure responsive means is at either of its limiting positions.

7. A windshield wiper motor including a casing having a fluid pressure chamber and a valve mechanism enclosing chamber therein, a transverse partitioning wall in said chamber having spaced ports extending therethrough, each communicating at one end with a fluid pressure medium outlet and at its other end with a fluid pressure medium inlet, a pair of passageways in said casing, one connecting each port with an end portion of said chamber respectively, a pressure responsive member in said chamber operable by said fluid pressure medium, a pair of valve elements, each disposed adjacent one of the opposite sides of said wall respectively and angularly disposed with respect to each other so as to alternately establish communication between one and then the other end of said chamber and said fluid medium inlet and alternately between the one and then other end of said chamber and said fluid pressure outlet respectively, and actuating apparatus for said valve elements including latch means including a pair of releasable stops each so constructed and arranged as to hold said valve elements against movement from one of its limiting positions respectively, and means operable by said pressure responsive means for releasing each of said stops when said pressure responsive means is in one of its limiting positions respectively.

8. In a fluid pressure motor including a pressure chamber having passages communicating with opposite extremities thereof respectively and including a pressure responsive member in said chamber; a valve mechanism including valve elements for alternately admitting fluid under pressure to one and then the other of said passages, a resilient means including a coil type torsional spring for actuating said valve elements, means responsive to movement of said pressure responsive member for torsionally tensioning said spring in different directions during respectively different directions of movement of said pressure responsive member, a pair of pivotally mounted latch elements each associated with one of said valve elements for holding the latter against movement until said pressure responsive member reaches an end of its stroke, one of said latch elements being operable to restrain movement of said valve element in one direction and the other being adapted to restrain movement of said valve element in an opposite direction, and means responsive to movement of said pressure responsive member for alternately rendering each of said latch elements inoperative.

9. A windshield wiper motor including a casing having a fluid pressure chamber and a valve mechanism enclosing chamber therein, a transverse partitioning wall in said chamber having spaced ports extending therethrough, each communicating at one end with a fluid pressure medium outlet and at its other end with a fluid pressure medium inlet, a supporting disc member mounted in spaced relation from and fixed to said partitioning wall, a pair of passageways in said casing, one connecting each port with an end portion of said chamber respectively, a pressure responsive member in said chamber operable by said fluid pressure medium, a pair of valve elements, each disposed adjacent one of the opposite sides of said partitioning wall respectively, one of said valve elements being disposed between said disc and the adjacent side of said wall, and actuating apparatus for operating said valve elements, including control members carried by said disc and operable only when said pressure responsive member is at an end of its stroke.

10. A windshield wiper motor including a casing having a cylinder therein and having a valve mechanism enclosing chamber, a transverse wall in said chamber substantially parallel to the axis of said cylinder providing an inlet and exhaust chamber on respectively opposite sides of said wall and having a pair of ports therein each communicating with both of said chambers and each having a passage leading therefrom to one end of said cylinder respectively, a shaft journaled in said wall extending normally to the axis of said cylinder, a piston in said cylinder, a resilient member biased between said shaft and said piston for turning said shaft, a pair of valve elements each associated with the corresponding ends of said ports respectively and mounted on said shaft for movement in unison therewith and one of said valve elements having spaced stops thereon operable in response to movement of said piston, and latch mechanism for holding said shaft and valve elements against movement relative to said casing during movement of said piston between its limiting positions, said latch mechanism including a pair of pivotally mounted detents, each associated with one of the stops of said valve element and only one of said detents being engageable with its associated stop at any one time.

11. A windshield wiper motor including a casing having a cylinder therein and having passages communicating with respectively opposite end portions of said cylinder for supplying a fluid pressure medium thereto and exhausting such medium therefrom, a piston in said cylinder, valve mechanism for controlling the supplying of said fluid pressure medium to and exhausting thereof from the respectively opposite ends of said cylinder including a resilient member biased between said valve mechanism and said piston, a support detachably securable to said casing, latch mechanism responsive to movement of said piston for holding said valve mechanism against movement while said piston is travelling between its opposite limiting positions, and manually operable control mechanism for stopping said motor including a detent adapted to prevent movement of said valve mechanism while said piston is at one of its limiting positions, said latch and control mechanism being carried by said support and adapted to be completely assembled thereon before installation of said support in said casing.

12. A windshield wiper motor including a casing having a cylinder therein and having passages communicating with respectively opposite end portions of said cylinder for supplying a fluid pressure medium thereto and exhausting said medium therefrom, a piston in said cylinder, and valve mechanism for controlling the supply and discharge of said fluid pressure medium to and from the respectively opposite ends of said cylinder, including a coil type torsional spring, means connecting said valve mechanism to said spring adjacent one end thereof, and means connecting said piston to said spring adjacent the other end thereof, so that said spring is torsionally stressed as said piston moves.

13. A windshield wiper motor including a casing having a cylinder therein and having passages communicating with respectively opposite end portions of said cylinder for supplying a fluid pressure medium thereto and exhausting said medium therefrom, a piston in said cylinder, and valve mechanism for controlling the supply and discharge of said fluid pressure medium to and from the respectively opposite ends of said cylinder, including a coil type torsional spring, means connecting said valve mechanism to said spring adjacent one end thereof, and means connecting said piston to said spring adjacent the other end thereof so that said spring is torsionally stressed as said piston moves, and mechanism responsive to movement of said piston for releasably holding said valve mechanism.

14. A windshield wiper motor including a casing having a cylinder therein and having passages communicating with respectively opposite end portions of said cylinder for supplying a fluid pressure medium thereto and exhausting said medium therefrom, a piston in said cylinder, and valve mechanism for controlling the supply and discharge of said fluid pressure medium to and from the respectively opposite ends of said cylinder, including a coil type torsional spring, means connecting said valve mechanism to said spring adjacent one end thereof, means connecting said piston to said spring adjacent the other end thereof so that said spring is torsionally stressed as said piston moves, and a manually operable locking mechanism including a member movable in blocking relation to said valve mechanism for positively holding the latter against movement.

ROBERT B. EVANS.